(12) United States Patent
Alexander et al.

(10) Patent No.: US 7,584,411 B1
(45) Date of Patent: Sep. 1, 2009

(54) METHODS AND APPARATUS TO IDENTIFY GRAPHICAL ELEMENTS

(75) Inventors: James M. Alexander, Mount Kisco, NY (US); Karen A. Melchior, Los Altos, CA (US)

(73) Assignee: Adobe Systems, Inc., San Jose, CA (US)

( * ) Notice: Subject to any disclaimer, the term of this patent is extended or adjusted under 35 U.S.C. 154(b) by 319 days.

(21) Appl. No.: 11/316,441

(22) Filed: Dec. 22, 2005

(51) Int. Cl.
*G06F 17/00* (2006.01)
*G06F 3/048* (2006.01)
*G06F 17/30* (2006.01)

(52) U.S. Cl. .................. 715/202; 715/200; 715/201; 715/204; 715/209; 715/233; 715/764; 707/5; 707/6; 704/9

(58) Field of Classification Search .............. 715/526, 715/764, 233, 200, 201, 202, 204, 209; 707/5, 707/6; 704/9
See application file for complete search history.

(56) References Cited

U.S. PATENT DOCUMENTS

| | | | | |
|---|---|---|---|---|
| 5,960,448 | A * | 9/1999 | Reichek et al. | 715/526 |
| 6,021,412 | A * | 2/2000 | Ho et al. | 707/104.1 |
| 7,028,253 | B1 * | 4/2006 | Lieberman et al. | 715/232 |
| 7,051,019 | B1 * | 5/2006 | Land et al. | 707/4 |
| 7,099,860 | B1 * | 8/2006 | Liu et al. | 707/3 |
| 7,143,348 | B1 * | 11/2006 | Krause | 715/526 |
| 7,283,992 | B2 * | 10/2007 | Liu et al. | 707/3 |
| 2005/0086223 | A1 * | 4/2005 | Rui | 707/5 |
| 2005/0108001 | A1 * | 5/2005 | Aarskog | 704/10 |

* cited by examiner

*Primary Examiner*—Steven P Sax
*Assistant Examiner*—Grant D Johnson
(74) *Attorney, Agent, or Firm*—Chapin IP Law, LLC (57) ABSTRACT

A system receives a selection of content within the digital composition, and derives conceptual information associated with the content. The conceptual information is used to identify the graphical element associated with the selection of content. The system obtains the graphical element associated with the content, and displays the graphical element within the digital composition.

23 Claims, 5 Drawing Sheets

220 DISPLAY THE GRAPHICAL ELEMENT WITHIN THE DIGITAL COMPOSITION

221 DISPLAY THE GRAPHICAL ELEMENT WITHIN A GRAPHICAL ELEMENT LOCATION WITHIN THE DIGITAL COMPOSITION

222 INDICATE THERE IS AT LEAST ONE ADDITIONAL GRAPHICAL ELEMENT AVAILABLE TO BE VIEWED WITHIN THE GRAPHICAL ELEMENT LOCATION WITHIN THE DIGITAL COMPOSITION

OR

223 INDICATE THERE IS A PLURALITY OF GRAPHICAL ELEMENTS EXCEEDING A THRESHOLD ASSOCIATED WITH THE DIGITAL COMPOSITION, THE THRESHOLD IDENTIFYING A MAXIMUM NUMBER OF GRAPHICAL ELEMENTS TO BE VIEWED WITHIN THE GRAPHICAL ELEMENT LOCATION WITHIN THE DIGITAL COMPOSITION

224 DIRECT THE USER TO A GRAPHICAL ELEMENTS DATABASE TO VIEW THE PLURALITY OF GRAPHICAL ELEMENTS

225 ALLOW A USER TO PERFORM AN ACTION, THE ACTION INCLUDING AT LEAST ONE OF:
I) SELECT THE GRAPHICAL ELEMENT FOR USE WITHIN THE DIGITAL COMPOSITION
II) DOWNLOAD THE GRAPHICAL ELEMENT FROM A GRAPHICAL ELEMENTS DATABASE CONTAINING A PLURALITY OF GRAPHICAL ELEMENTS
III) PURCHASE THE GRAPHICAL ELEMENT FOR USE WITHIN THE DIGITAL COMPOSITION

FIG. 5

METHODS AND APPARATUS TO IDENTIFY GRAPHICAL ELEMENTS

BACKGROUND

Conventional computerized devices, such as personal computers, laptop computers, and the like utilize graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects by dragging and dropping text, text boxes, graphical elements, etc. into the document and/or project. Users can select the graphical elements (i.e., photographs, graphics, etc) used in the documents by selecting images from content providers. Content providers provide graphical elements (e.g., photographs, graphics, etc) for document developers to view and/or purchase from content provider web sites. Document developers are able to perform online searches by providing search criteria such as keywords, and then choose from the results to make a purchase. As an example, if a document developer is looking for pictures of cars, they can visit a content provider web site that sells graphical elements and can enter the search term "cars". In response, the content provider web site searches a library of graphical elements (that may include more than one content provider web site) and can compile the results of the search. The document developer can then choose the appropriate graphical element(s) from the search results.

SUMMARY

Conventional technologies for providing customers with purchasable graphical elements suffer from a variety of deficiencies. In particular, conventional technologies that provide users with graphical elements are limited in that the user has to go to a content provider web site, search for graphical elements that match the user's requirements, view the available graphical elements that match those requirements, choose the suitable graphical element(s), and place the chosen graphical element(s) in the appropriate place in the user's document.

Embodiments disclosed herein significantly overcome such deficiencies and provide a system that includes a computer system executing a graphical element identifying process. Based on the content (i.e., the text and/or the graphical elements) within a digital composition (i.e., a document, etc), the graphical element identifying process determines the concept, or theme of the digital composition, and obtains a graphical element from, for example, a content provider web site. In an example configuration, the graphical elements are provided by the application in which the user enters the content. The graphical element is chosen to match the concept of the digital composition. The graphical element identifying process then places the selected graphical element (i.e., the graphical elements for selection by a user) in a graphical element location within the digital composition. The graphical element identifying process can display one or more graphical elements for the user to select. Graphical elements are chosen to match the concept of the digital composition by matching keywords associated with the graphical element to keywords associated with the content (i.e., text and/or graphical elements already existing within the content).

The graphical element identifying process receives a selection of content within the digital composition. Based on that selection, the graphical element identifying process derives conceptual information associated with the content. The conceptual information is used to identify the graphical element associated with the selection of content. The graphical element identifying process then obtains the graphical element associated with the content, and displays the graphical element (or multiple graphical elements) within the digital composition.

During an example operation of one embodiment, suppose a document developer is developing a brochure for a charity golf event. The document developer enters the details of the charity golf event (i.e., the time, location, the charity involved, celebrities who will be in attendance, etc) into an application used to develop the brochure. The graphical element identifying process receives a selection of the details of the charity golf event, for example, via a user highlighting the selection within the application used to develop the brochure. The graphical element identifying process derives the concept of the brochure by identifying keywords within the selection, such as "golf course". The graphical element identifying process matches the search criteria to one or more graphical element databases containing photographs, images and other graphical elements. The graphical element identifying process then obtains those graphical elements that match the search criteria of "golf course", and displays those graphical elements within the application used to develop the brochure, at an appropriate location on the brochure.

Other embodiments of the disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. Embodiments disclosed herein, may be employed in data communications devices and other computerized devices and software systems for such devices such as those manufactured by Adobe Systems, Inc. of San Jose, Calif.

BRIEF DESCRIPTION OF THE DRAWINGS

The foregoing disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system that performs a graphical element identifying process that executing a graphical element identifying process. Based on the content (i.e., the text and/or the graphical elements) within a digital composition (i.e., a document, etc), the graphical element identifying process determines the concept, or theme of the digital composition, and obtains a graphical element (i.e., image, photograph, video, etc) from a content provider web site, such as a graphical element database (or more than one graphical element databases). The graphical element is chosen to match the concept of the digital composition. The graphical element identifying process places the selected graphical element in a graphical element location within the digital composition. In an example embodiment, the content can be selected by a user and the graphical element identifying process invoked by the user. In another example embodiment, the graphical element identifying process automatically obtains graphical elements that match the concept of the content, and dynamically updates those results (i.e., the graphical elements obtained to match the concept of the content) as additional content is added to the digital composition. In yet another example embodiment, the graphical element identifying process automatically obtains graphical elements based on, for example, words, that occur within the content more than a predefined number of times, within the content. For example, if the phrase 'golf course' occurs within the content, for example, more than three times, then the graphical element identifying process would automatically obtain graphical elements that match the concept of a golf course.

In one embodiment, the graphical element identifying process receives a selection of content within the digital composition. Based on that selection, the graphical element identifying process derives conceptual information associated with the content. The conceptual information is used to identify the graphical element associated with the selection of content. The graphical element identifying process then obtains the graphical element associated with the content, and displays the graphical element within the digital composition, for a user to view. The user can select the displayed graphical element, or choose from multiple graphical elements that are presented to the user.

Figure 1:
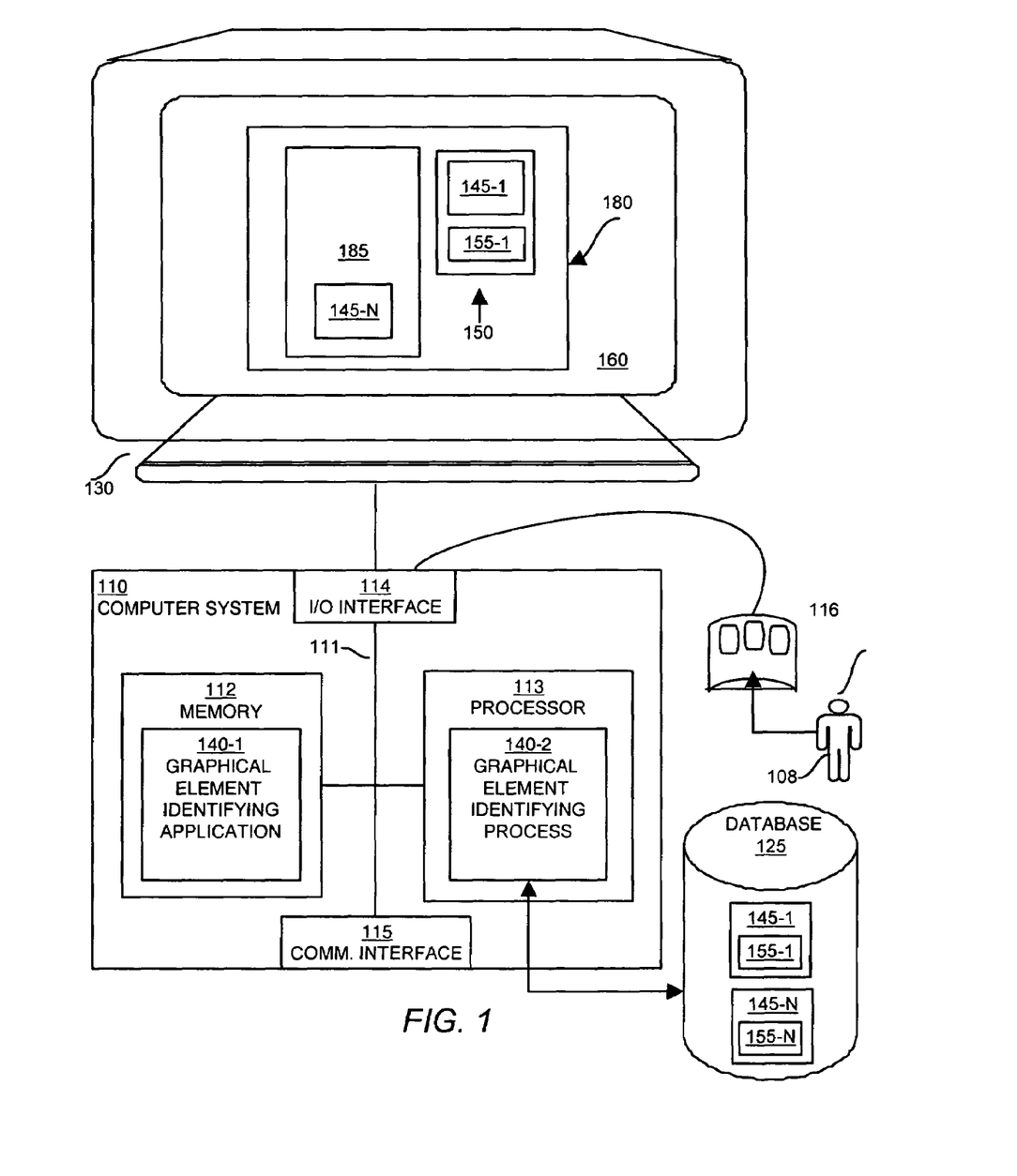
FIG. 1 shows a high-level block diagram of a computer system according to one embodiment disclosed herein.

FIG. 1 is a block diagram illustrating example architecture of a computer system 110 that executes, runs, interprets, operates or otherwise performs a graphical element identifying application 140-1 and process 140-2 suitable for use in explaining example embodiments disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114 and enables a user 108 to provide input commands and generally control the graphical user interface 160 on the display 130. The graphical user interface 160 contains a digital composition 180 containing content 185 (that can also contain graphical elements 145-N) and a graphical element location 150. The graphical element location 150 contains a graphical element 145-1 and attributes 155-1 associated with the graphical element 145-1. Also in this example configuration, a graphical elements database 125 stores graphical elements 145-N (and attributes 155-N associated with those graphical elements 145-N) developed in accordance with techniques described herein within a computer readable medium. The communications interface 115 enables the computer system 110 to communicate with other devices (i.e., other computers) on a network (not shown). This can allow access to the graphical element identifying application by remote computer systems.

The memory system 112 is any type of computer readable medium and in this example is encoded with a graphical element identifying application 140-1 that supports generation, display, and implementation of functional operations of the graphical user interface 160 as explained herein. The graphical element identifying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the graphical element identifying application 140-1. Execution of graphical element identifying application 140-1 in this manner produces processing functionality in a graphical element identifying process 140-2. In other words, the graphical element identifying process 140-2 represents one or more portions or runtime instances of the graphical element identifying application 140-1 (or the entire application 140-1) performing or executing within or upon the processor 113 in the computerized device 110 at runtime. The graphical element identifying process 140-2 operates as explained herein to identify graphical elements 145-N to be used in the development of a digital composition 180 within the graphical user interface 160.

It is noted that example configurations disclosed herein include the graphical element identifying application 140-1. The graphical element identifying application 140-1 may be stored on a computer readable medium (such as a floppy disk), hard disk, electronic, magnetic, and optical or other computer readable medium. The graphical element identifying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the graphical element identifying application 140-1 in the processor 113 as the graphical element identifying process 140-2. Those skilled in the art will understand that the computer system 110 may include other processes and/or software and hardware components, such as an operating system not shown in this example.

A display 130 need not be coupled directly to computer system 110. For example, the graphical element identifying application 140-1 can be executed on a remotely accessible computerized device via the network interface 115. In this instance, the graphical user interface 160 may be displayed locally to a user of the remote computer and execution of the processing herein may be client-server based.

Further details of configurations explained herein will now be provided with respect to a flow chart of processing steps that show the high level operations disclosed herein to perform the graphical element identifying process 140-2.

Figure 2:
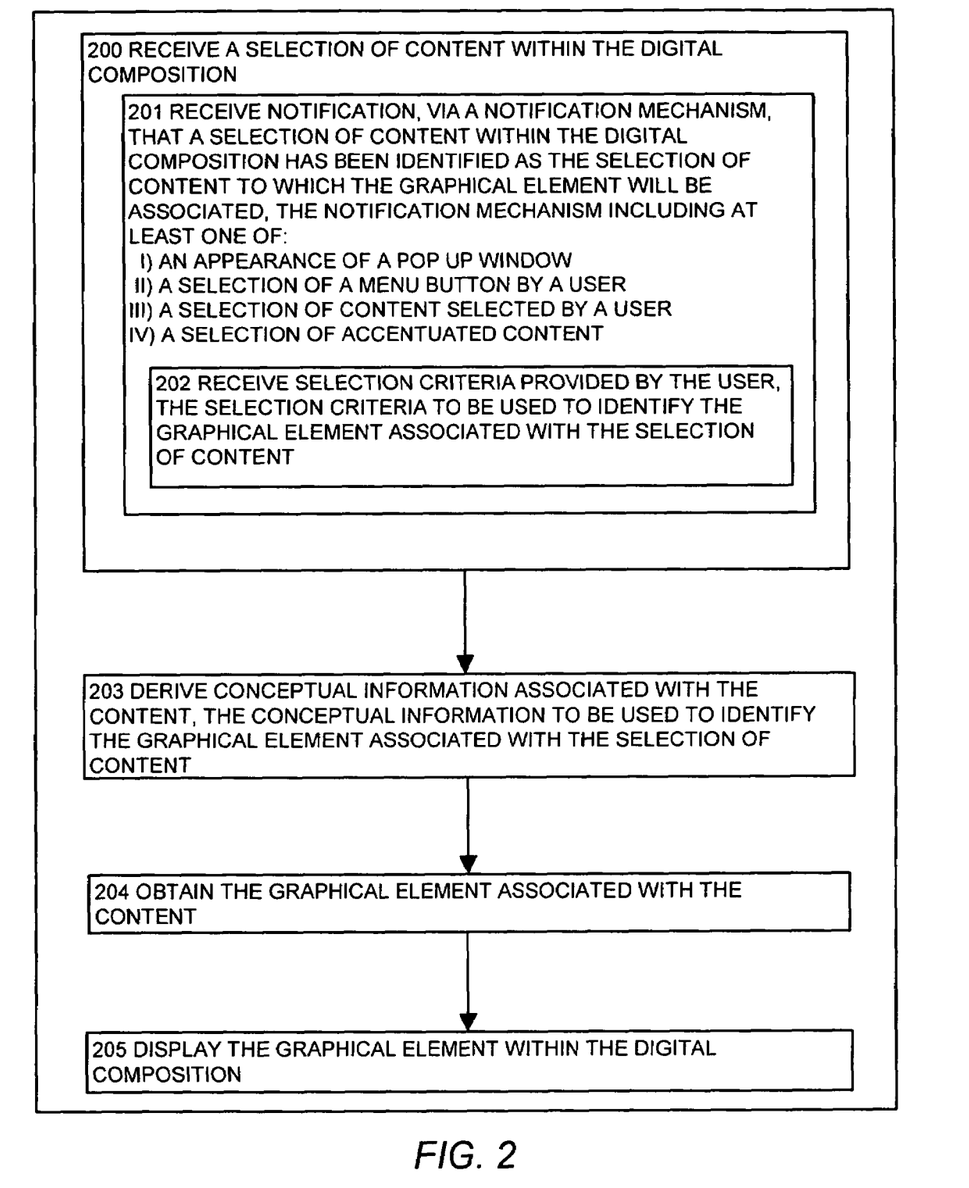
FIG. 2 illustrates a flowchart of an embodiment of a procedure performed by the system of FIG. 1 when the graphical element identifying process receives a selection of content within the digital composition, and displays a graphical element within the digital composition.

FIG. 2 is an embodiment of the steps performed by the graphical element identifying process 140-2 when it receives a selection of content 185 from a digital composition 180 and obtains a graphical element 145-1 that matches the concept of the selected content 185, according to one embodiment disclosed herein.

In step 200, the graphical element identifying process 140-2 receives a selection of content 185 within the digital composition 180. In an example configuration, as a user 108 enters content 185 into the digital composition 180, a pop up window appears containing the selection of content 185 that the graphical element identifying process 140-2 will use to obtain a graphical element 145-1 that matches the concept (i.e., the central 'theme') of the selection of content 185. It should be noted that content 185 can contain, but is not limited to, graphical elements 145-N as well as other content 185, such as text. In an example embodiment, the concept is determined by keywords contained within the content.

In step 201, the graphical element identifying process 140-2 receives notification, via a notification mechanism, that a selection of content 185 within the digital composition 180 has been identified as the selection of content 185 to which a graphical element 145-1 will be associated. For example, the notification mechanism could be a pop up window, a menu button, content 185 selected by a user 108, or accentuated content 185. In an example configuration, the graphical element identifying process 140-2 receives notification of selected content 185 via a pop up window that appears, displaying a selection of content 185 from the digital composition 180 that is used to derive the concept of the selected content 185. In another example configuration, the application used to create the digital composition 180 provides a menu button that a user 108 can select to notify the graphical element identifying process 140-2 that a portion of content 185 has been selected. In yet another example configuration, a user 108, who highlights a portion of content 185, identifies the selection of content 185. In yet another example configuration, the selection of content 185, such as text, is accentuated within the digital composition 180, for example, by either highlighting the content 185 or underlining the content 185 in a color that matches or contrasts with the color of the font in which the content (i.e., text) is written. The user 108 can then request that the graphical element identifying process 140-2 obtains a graphical element 145-1 or multiple graphical elements 145-N. In an example configuration, the graphical element identifying process 140-2 automatically obtains a graphical element 145-1 or multiple graphical elements 145-N.

In step 202, the graphical element identifying process 140-2 receives selection criteria provided by the user 108. The selection criteria are used to identify the graphical element 145-1 associated with the selection of content 185. In an example configuration, a user 108 can specify selection criteria from which the graphical element 145-1 should be selected by the graphical element identifying process 140-2. In this example, a user 108 might provide keywords to use to select the graphical element 145-1, as well as operators, such as "and" and "or" with which to further refine the search criteria. In other words, a user 108 could specify "golf and course" as selection criteria from which the graphical element 145-1 would be selected by the graphical element identifying process 140-2. This selection criteria would result in the selection of graphical elements 145-N related to "golf courses".

In step 203, the graphical element identifying process 140-2 derives conceptual information associated with the content 185. The conceptual information is used to identify the graphical element 145-1 associated with the selection of content 185. In an example configuration, the concept of the selection of content 185 is derived from one word of text within the digital composition 180 or a plurality of words, or even a combination of words and graphical elements 145-N that already exist within the digital composition 180.

In step 204, the graphical element identifying process 140-2 obtains the graphical element 145-1 associated with the content 185. The graphical element identifying process 140-2 obtains the graphical element 145-1 from a graphical elements database 125. In an example configuration, the graphical elements database 125 is a graphical elements provider web site, or more than one graphical elements provider web sites.

In step 205, the graphical element identifying process 140-2 displays the graphical element 145-1 within the digital composition 180. In an example configuration, as a user 108 enters content 185 within the digital composition 180, the graphical element identifying process 140-2 automatically displays appropriate graphical elements 145-N within the digital composition 180. It should be noted that the graphical elements 145-N could be images, videos, etc.

Figure 3:
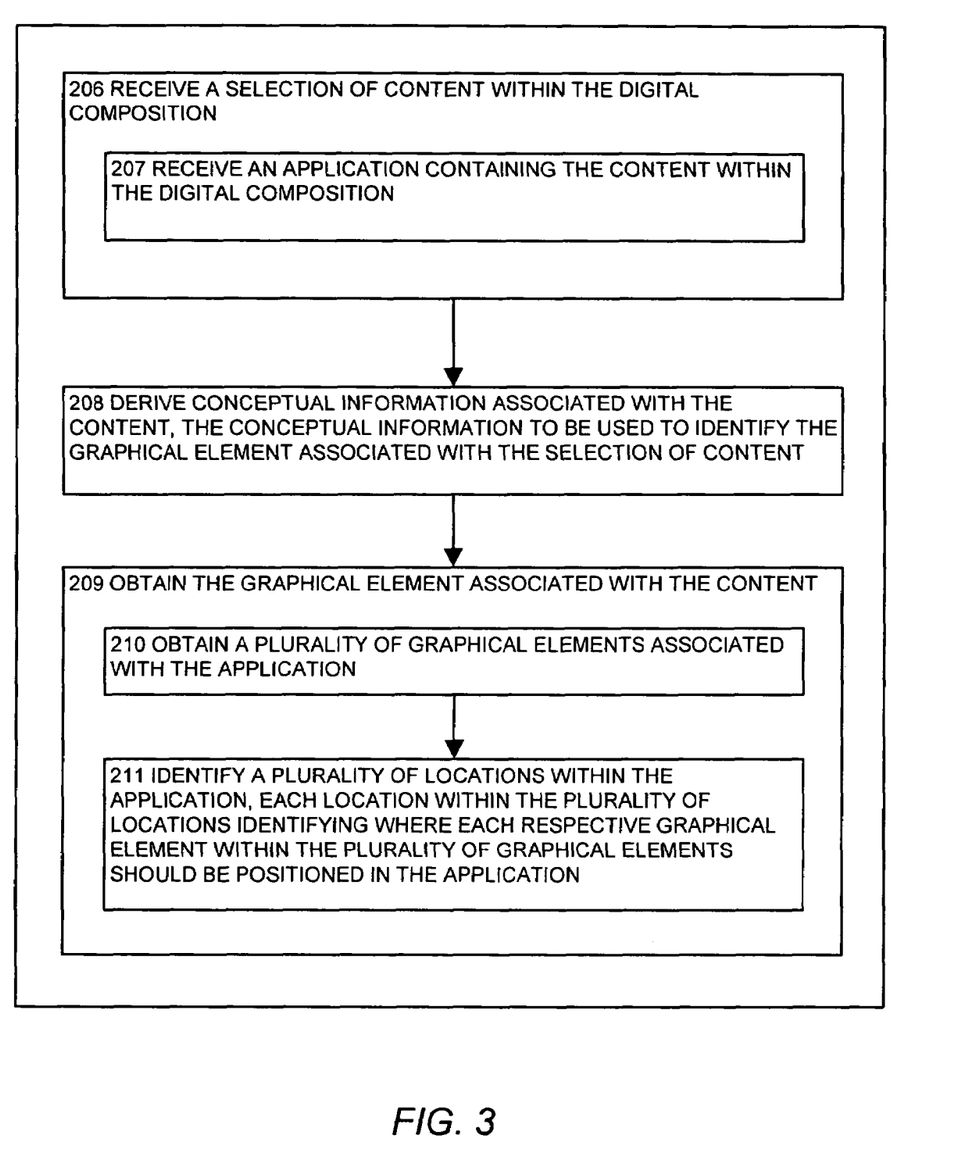
FIG. 3 illustrates a flowchart of an embodiment of a procedure performed by the system of FIG. 1 when the graphical element identifying process receives a selection of content within the digital composition, and displays a plurality of graphical elements within the digital composition.

FIG. 3 is an embodiment of the steps performed by the graphical element identifying process 140-2 when it receives a selection of content 185 from a digital composition 180, via an upload of an application containing the digital composition 180, and obtains a graphical element 145-1 that matches the concept of the selected content 185, according to one embodiment disclosed herein.

In step 206, the graphical element identifying process 140-2 receives a selection of content 185 within the digital composition 180. In an example configuration, the selection of content 185 is all of the content 185 contained within the digital composition 180.

In step 207, the graphical element identifying process 140-2 receives an application containing the contents 185 within the digital composition 180. In an example configuration, the graphical element identifying process 140-2 receives an application, for example, an MS WORD® word processing document or a POWERPOINT® graphical processing presentation, as the selection of content 185.

In step 208, the graphical element identifying process 140-2 derives conceptual information associated with the content 185. The conceptual information to be used to identify the graphical elements 145-N associated with the content 185. In an example configuration, the graphical element identifying process 140-2 derives the concept of a whole PowerPoint presentation (i.e., the text of the PowerPoint presentation as well as any graphical elements 145-N within the PowerPoint presentation).

In step 209, the graphical element identifying process 140-2 obtains the graphical elements 145-N associated with the content 185. The graphical elements 145-N are obtained from the graphical elements database 125.

In step 210, the graphical element identifying process 140-2 obtains a plurality of graphical elements 145-N associated with the application. In an example configuration, based on the concept derived from the whole PowerPoint presentation uploaded to the graphical element identifying process 140-2, the graphical element identifying process 140-2 obtains a plurality of graphical elements 145-N that match the concept of the PowerPoint presentation.

In step 211, the graphical element identifying process 140-2 identifies a plurality of locations within the application. Each location within the plurality of locations identifies where each respective graphical element 145-1 within the plurality of graphical elements 145-N should be positioned in the application. In an example configuration, the graphical element identifying process 140-2 provides the graphical elements 145-N that match the concept of the PowerPoint presentation, and also provides information as to where within the PowerPoint presentation (i.e., which pages within the PowerPoint presentation), those graphical elements 145-N should be placed.

Figure 4:
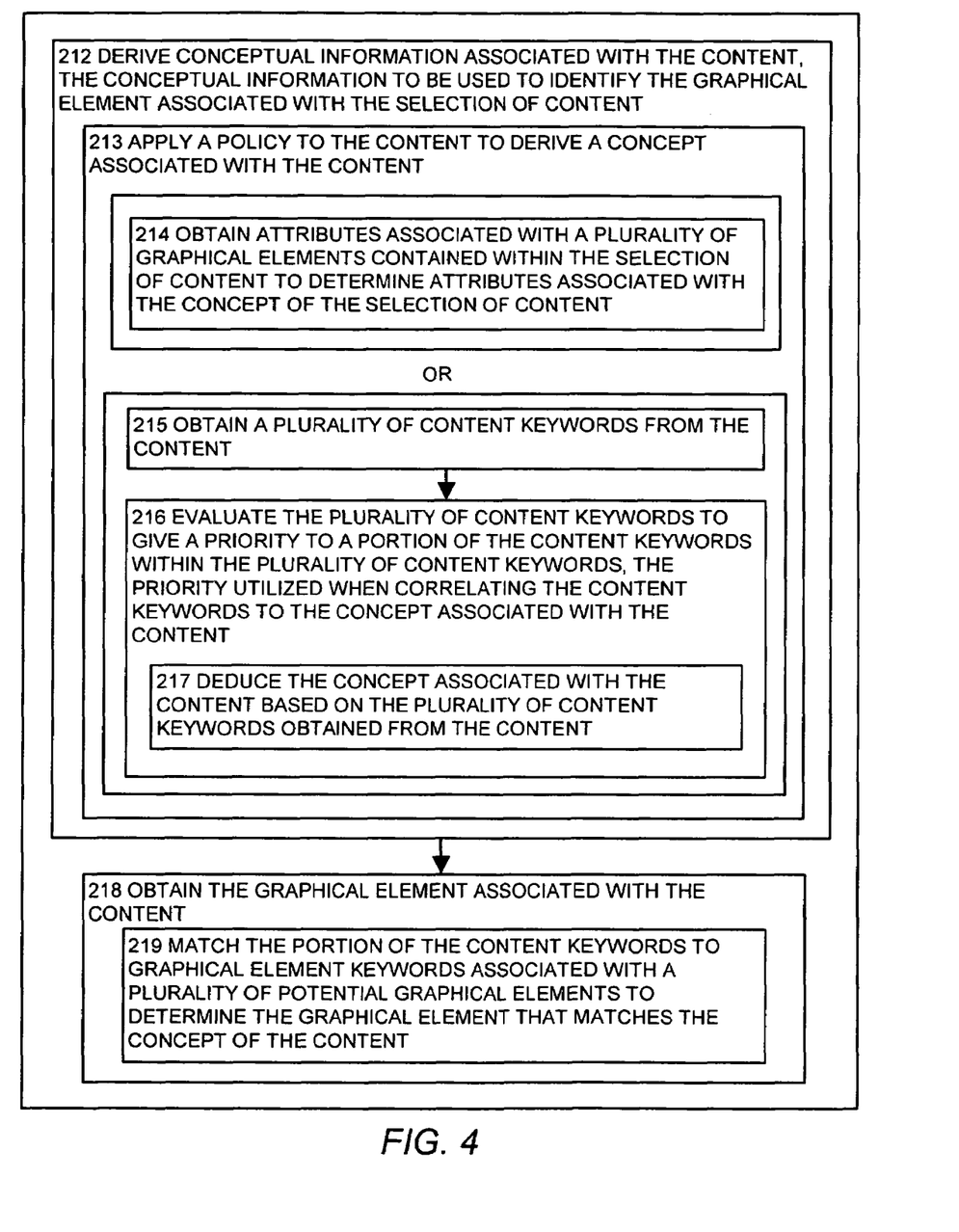
FIG. 4 illustrates a flowchart of an embodiment of a procedure performed by the system of FIG. 1 when the graphical element identifying process derives conceptual information associated with the content.

FIG. 4 is an embodiment of the steps performed by the graphical element identifying process 140-2 when it derives conceptual information associated with the content 185, and obtains the graphical element 145-1 based on that derived concept, according to one embodiment disclosed herein.

In step 212, the graphical element identifying process 140-2 derives conceptual information associated with the content 185. The conceptual information is used to identify the graphical element 145-1 associated with the selection of content 185. In an example configuration, the concept of the selection of content 185 is derived from one word of text within the digital composition 180 or a plurality of words, or even a combination of words and graphical elements 145-1 that already exist within the digital composition 180.

In step 213, the graphical element identifying process 140-2 applies a policy to the content 185 to derive a concept associated with the content 185. In an example configuration, the graphical element identifying process 140-2 views the selected content 185, and applies a policy to the selected content 185 to determine the concept of the content 185. For example, the policy might dictate to strip out unnecessary words, such as "the", "an", "a", etc. from the content 185, and then use the remaining words in the selected content 185 as keywords with which to search the graphical elements database 125.

In step 214, the graphical element identifying process 140-2 obtains attributes 155-N associated with a plurality of graphical elements 145-N contained within the selection of content 185, to determine attributes associated with the concept of the selection of content 185. In an example configuration, the selected content 185 contains both text and graphical elements 145-N. Attributes 155-N (or metadata) of those graphical elements 145-N, such as keywords associated with the graphical elements 145-N, or the color space of those graphical elements 145-N (i.e., the color schemes, the brightness value, contrast value, colored images versus black and white images, etc) are used as search criteria when searching for graphical elements 145-N within the graphical elements database 125 that match the concept of the graphical elements 145-N already contained within the selection of content 185 within the digital composition 180.

Alternatively, in step 215, the graphical element identifying process 140-2 obtains a plurality of content keywords from the content 185. In an example configuration, the graphical element identifying process 140-2 obtains a plurality of content keywords associated with the content 185. The keywords can be gleaned from the text within the content, or can be keywords (i.e., attributes 155-N) associated with graphical elements 145-N already contained within the selection of content 185 within the digital composition 180.

In step 216, the graphical element identifying process 140-2 evaluates the plurality of content keywords to give a priority to a portion of the content keywords within the plurality of content keywords. The priority is utilized when correlating the content keywords to the concept associated with the content 185. In other words, within the group of keywords gleaned from the selection of content 185, some of the keywords will be given greater weight than others when determining the concept of the selection of content 185. For example, if the content 185 contains keywords such as "night life" and "Paris", the concept of the content 185 has more to do with "night life in Paris" than with "night life" in general.

In step 217, the graphical element identifying process 140-2 deduces the concept associated with the content 185 based on the plurality of content keywords obtained from the content 185. For example, if the keywords gleaned from the content 185 are "dog", "car" and "beach", the graphical element identifying process 140-2 could infer that the concept of the content 185 is related to leisure time activities.

In step 218, the graphical element identifying process 140-2 obtains the graphical element 145-1 associated with the content 185. The graphical element identifying process 140-2 obtains the graphical element 145-1 from a graphical elements database 125. In an example configuration, the graphical elements database 125 is a graphical elements provider web site, or more than one graphical elements provider web sites.

In step 219, the graphical element identifying process 140-2 matches the portion of the content keywords to graphical element keywords associated with a plurality of potential graphical elements 145-N to determine the graphical element 145-1 that matches the concept of the content 185. In other words, the graphical element identifying process 140-2 uses those content keywords as search criteria when searching the graphical elements database 125 (i.e., the graphical elements provider web sites). The content keywords are matched against graphical element keywords (i.e., attributes 155-N) that are associated with the graphical elements 145-N contained within the graphical elements database 125.

Figure 5:
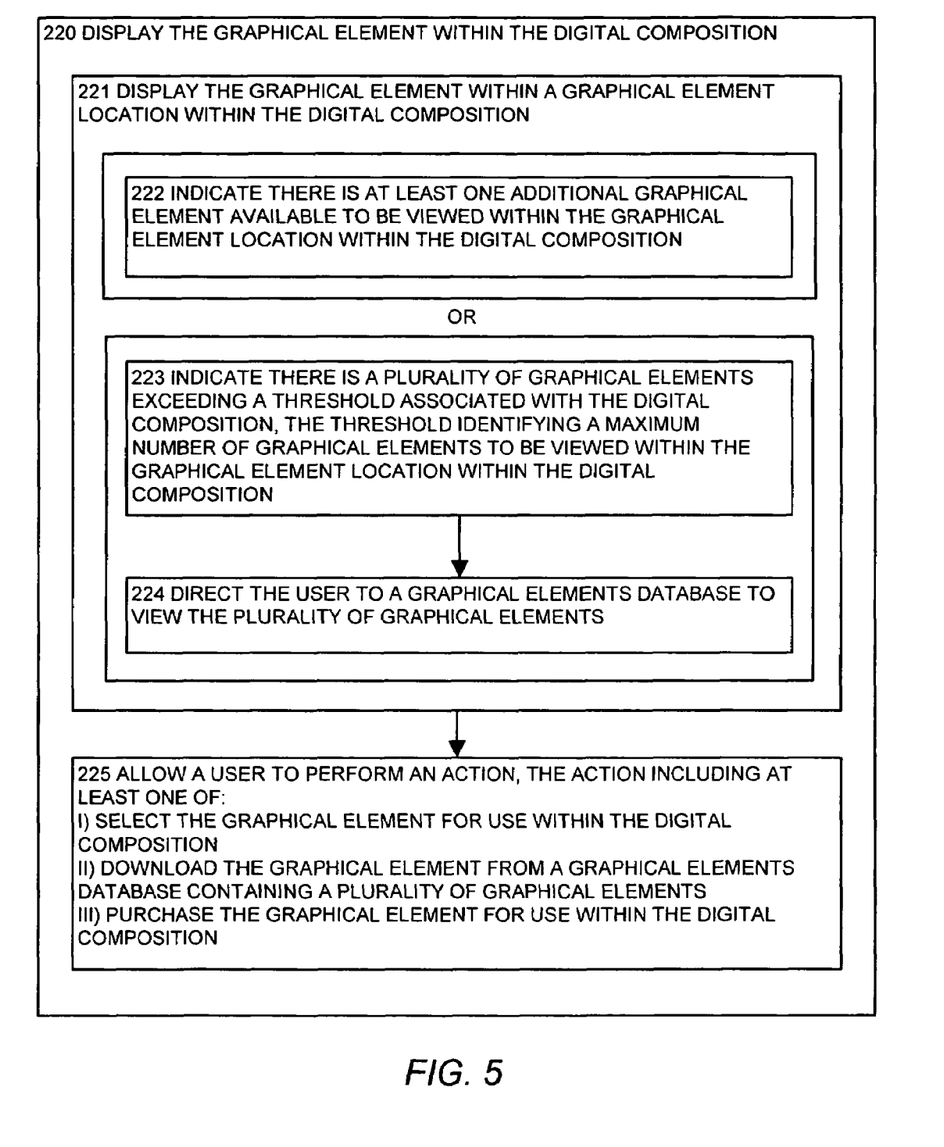
FIG. 5 illustrates a flowchart of an embodiment of a procedure performed by the system of FIG. 1 when the graphical element identifying process displays the graphical element within the digital composition.

FIG. 5 is an embodiment of the steps performed by the graphical element identifying process 140-2 when it displays the graphical element 145-1 within the digital composition 180, and allows a user 108 to perform an action on the displayed graphical element 145-1, according to one embodiment disclosed herein.

In step 220, the graphical element identifying process 140-2 displays the graphical element 145-1 within the digital composition 180. In an example configuration, the digital composition 180 contains areas designated for text and areas designated for displaying graphical elements 145-N.

In step 221, the graphical element identifying process 140-2 displays the graphical element 145-1 within a graphical element location 150 within the digital composition 180. In an example configuration, the digital composition 180 contains a graphical element location 150 where the graphical element identifying process 140-2 displays the graphical element 145-1 for the user 108 to view the graphical element 145-1 selected by the graphical element identifying process 140-2.

In step 222, the graphical element identifying process 140-2 indicates there is at least one additional graphical element 145-1 available to be viewed within the graphical element location 150 within the digital composition 180. In an example configuration, if there is more than one graphical element 145-1 to display within the graphical element location 150, the graphical element identifying process 140-2 displays only one graphical element 145-1 at a time. The graphical element identifying process 140-2 indicates there are more graphical elements 145-N for viewing by modifying the graphical elements location 150 to include, for example, slider bars indicating there are more graphical elements 145-N for display.

In step 223, the graphical element identifying process 140-2 indicates there is a plurality of graphical elements 145-N exceeding a threshold associated with the digital composition 180. The threshold identifies a maximum number of graphical elements 145-N to be viewed within the graphical element location 150 within the digital composition 180. In an example configuration, the digital composition 180 has a maximum number of graphical elements 145-N that can be displayed within the graphical elements location 150. Once that maximum is reached, the graphical element identifying process 140-2 indicates to the user 108 that more graphical elements 145-N (that have been identified as matching the concept derived from the selection of content 185) have been identified.

In step 224, the graphical element identifying process 140-2 directs the user 108 to a graphical elements database 125 to view the plurality of graphical elements 145-N. In an example configuration, the graphical element identifying process 140-2 notifies the user 108 that the maximum number of graphical elements 145-N (that can be displayed within the graphical elements location 150) has been reached, and the graphical elements 145-N (that have been identified as matching the concept derived from the selection of content 185) can be viewed at the graphical elements provider web site(s). The graphical element identifying process 140-2 then directs the user 108 to those web sites.

In step 225, the graphical element identifying process 140-2 allow a user to perform an action, such as selecting, downloading and/or purchasing the graphical element 145-N. In an example configuration, the user 108 views the available graphical elements 145-N, selects one graphical element 145-I that is matches the concept of the digital composition 180, purchases that graphical element 145-1 from the graphical element content provider, and downloads the graphical element 145-1 for use in the digital composition 180.

In an example configuration, the graphical element identifying process 140-2 is automatically invoked based on the entire content 185 of the digital composition 180. In another example configuration, the graphical element identifying process 140-2 is automatically invoked based on a portion of the content 185, such as a page, chapter, paragraph, sentence, etc.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

The invention claimed is:

1. A computer-implemented method in which at least one computer system accesses instructions from computer storage and executes the instructions to perform steps comprising:
   receiving a selection of content within a digital composition, the digital composition comprising a document;
   deriving conceptual information associated with the selected content;
   utilizing the conceptual information to identify a plurality of graphical elements associated with the selected content, the plurality of graphical elements comprising a first image devoid of text and at least a second image devoid of text;
   obtaining the first image and the second image, wherein obtaining includes: identifying a plurality of document locations, each location identifying where a respective image should be placed in the document;
   displaying the first image in conjunction with displaying the second image, the first image displayed within the document with information describing a first document location, the second image displayed within the document with information describing a second document location, the second document location differing from the first document location; and
   indicating whether a plurality of images exceeds a threshold associated with the document, the threshold representing a maximum number of images to be viewed within a respective document location.

2. The computer-implemented method of claim 1 wherein receiving the selection of content includes:
   receiving notification, via a notification mechanism, that a selection of content within the document has been identified as the selection of content to which the plurality of graphical elements will be associated, the notification mechanism including at least one of:
   i) an appearance of a pop up window;
   ii) a selection of a menu button by a user;
   iii) a selection of content selected by a user; and
   iv) a selection of accentuated content.

3. The computer-implemented method of claim 2 wherein receiving the notification via the notification mechanism includes:
   receiving selection criteria provided by the user, the selection criteria to be used to identify the plurality of graphical elements associated with the selection of content.

4. The computer-implemented method of claim 1 wherein receiving the selection of content includes:
   receiving an application containing the content within document.

5. The computer-implemented method of claim 1 wherein deriving conceptual information associated with the selected content includes:
   applying a policy to the selected content to derive a concept associated with the selected content.

6. The computer-implemented method of claim 5 wherein applying the policy to the selected content includes:
   obtaining a plurality of content keywords from the selected content; and
   evaluating the plurality of content keywords to give a priority to a portion of the content keywords within the plurality of content keywords, the priority utilized when correlating the content keywords to the concept associated with the selected content; and
   wherein obtaining the first image and the second image includes:
      matching the portion of the content keywords to graphical element keywords associated with a plurality of potential graphical elements to determine the graphical element that matches the concept of the content.

7. The computer-implemented method of claim 6 wherein evaluating the plurality of content keywords includes
   deducing the concept associated with the selected content based on the plurality of content keywords obtained from the selected content.

8. The computer-implemented method of claim 1 wherein displaying the first image in conjunction with displaying the second image includes:
   allowing a user to perform an action, the action including at least one of:
      i) selecting a displayed image for use in the document;
      ii) downloading a displayed image from an image database; and
      iii) purchasing a displayed image for use within the document.

9. The computer-implemented method of claim 8 wherein displaying the first image in conjunction with displaying the second image includes:
   indicating there is at least one additional image available to be viewed within one of the first document location and the second document location.

10. The computer-implemented method of claim 8 wherein displaying the graphical element within a graphical element location within the digital composition comprises:
    directing the user to an image database to view the plurality of graphical elements.

11. The computer-implemented method as in claim 1, comprising:
    wherein receiving the selection of content within a digital composition includes:
       detecting presence of at least one portion of document text highlighted by a user accessing the document via a document editor application.

12. A computerized device comprising:
    a memory;
    a processor;
    a communications interface;
    an interconnection mechanism coupling the memory, the processor and the communications interface;
    wherein the memory is encoded with a graphical element identifying application that when executed on the processor performs the operations of:
       receiving a selection of content within a digital composition, the digital composition comprising a document;
       deriving conceptual information associated with the selected content;
       utilizing the conceptual information to identify a plurality of graphical elements associated with the selected content, the plurality of graphical elements comprising a first image devoid of text and at least a second image devoid of text;
       obtaining the first image and the second image, wherein obtaining includes: identifying a plurality of document locations, each location identifying where a respective image should be placed in the document;
       displaying the first image in conjunction with displaying the second image, the first image displayed within the document with information describing a first document location, the second image displayed within the document with information describing a second document location, the second document location differing from the first document location; and
       indicating whether a plurality of images exceeds a threshold associated with the document, the threshold representing a maximum number of images to be viewed within a respective document location.

13. The computerized device of claim 12 wherein when the computerized device performs the operation of receiving the selection of content, the computerized device performs the operation of:
    receiving notification, via a notification mechanism, that a selection of content within the document has been identified as the selection of content to which the plurality of graphical elements will be associated, the notification mechanism including at least one of:
       i) an appearance of a pop up window;
       ii) a selection of a menu button by a user;
       iii) a selection of content selected by a user; and
       iv) a selection of accentuated content.

14. The computerized device of claim 13 wherein when the computerized device performs the operation of receiving notification, via the notification, the computerized device performs the operation of:
    receiving selection criteria provided by the user, the selection criteria to be used to identify the plurality of graphical elements associated with the selected content.

15. The computerized device of claim 12 wherein when the computerized device performs the operation of receiving the selection of content, the computerized device performs the operation of:
    receiving an application containing the content within the document.

16. The computerized device of claim 12 wherein when the computerized device performs the operation of deriving conceptual information associated with the selected content, the computerized device performs the operation of:
    applying a policy to the selected content to derive a concept associated with the selected content.

17. The computerized device of claim 16 wherein when the computerized device performs the operation of applying the policy to the selected content, the computerized device performs the operations of:
    obtaining a plurality of content keywords from the selected content; and
    evaluating the plurality of content keywords to give a priority to a portion of the content keywords within the plurality of content keywords, the priority utilized when correlating the content keywords to the concept associated with the selected content; and
    wherein when the computerized device performs the operation of obtaining the first image and the second image, the computerized device performs the operation of:
       matching the portion of the content keywords to graphical element keywords associated with a plurality of potential graphical elements to determine the graphical element that matches the concept of the content.

18. The computerized device of claim 17 wherein when the computerized device performs the operation of evaluating the plurality of content keywords, the computerized device performs the operation of:
deducing the concept associated with the selected content based on the plurality of content keywords obtained from the selected content.

19. The computerized device of claim 16 wherein when the computerized device performs the operation of applying the policy to the selected content, the computerized device performs the operation of:
obtaining attributes associated with a plurality of graphical elements contained within the selection of content to determine attributes associated with the concept of the selected content.

20. The computerized device of claim 12 wherein when the computerized device performs the operation of displaying the first image in conjunction with displaying the second image, the computerized device performs the operations of:
allowing a user to perform an action, the action including at least one of:
   i) selecting a displayed image for use within the document;
   ii) downloading a displayed image from an image database containing the plurality of graphical elements; and
   iii) purchasing a displayed image for use within the document.

21. The computerized device of claim 20 wherein when the computerized device performs the operation of displaying the first image in conjunction with displaying the second image, the computerized device performs the operation of:
indicating there is at least one additional image available to be viewed within one of the first document location and the second document location.

22. The computerized device of claim 20 wherein displaying the first image in conjunction with displaying the second image, the computerized device performs the operations of:
directing the user to an image database to view the plurality of graphical elements.

23. A computer readable storage medium encoded with computer programming logic that when executed on a process in a computerized device produces a graphical element identifying process that performs the operations of:
receiving a selection of content within a digital composition, the digital composition comprising a document;
deriving conceptual information associated with the selected content;
utilizing the conceptual information to identify a plurality of graphical elements associated with the selected content, the plurality of graphical elements comprising a first image devoid of text and at least a second image devoid of text;
obtaining the first image and the second image, wherein obtaining includes: identifying a plurality of document locations, each location identifying where a respective image should be placed in the document;
displaying the first image in conjunction with displaying the second image, the first image displayed within the document with information describing a first document location, the second image displayed within the document with information describing a second document location, the second document location differing from the first document location; and
indicating whether a plurality of images exceeds a threshold associated with the document, the threshold representing a maximum number of images to be viewed within a respective document location.

* * * * *